United States Patent Office 3,395,565
Patented Aug. 6, 1968

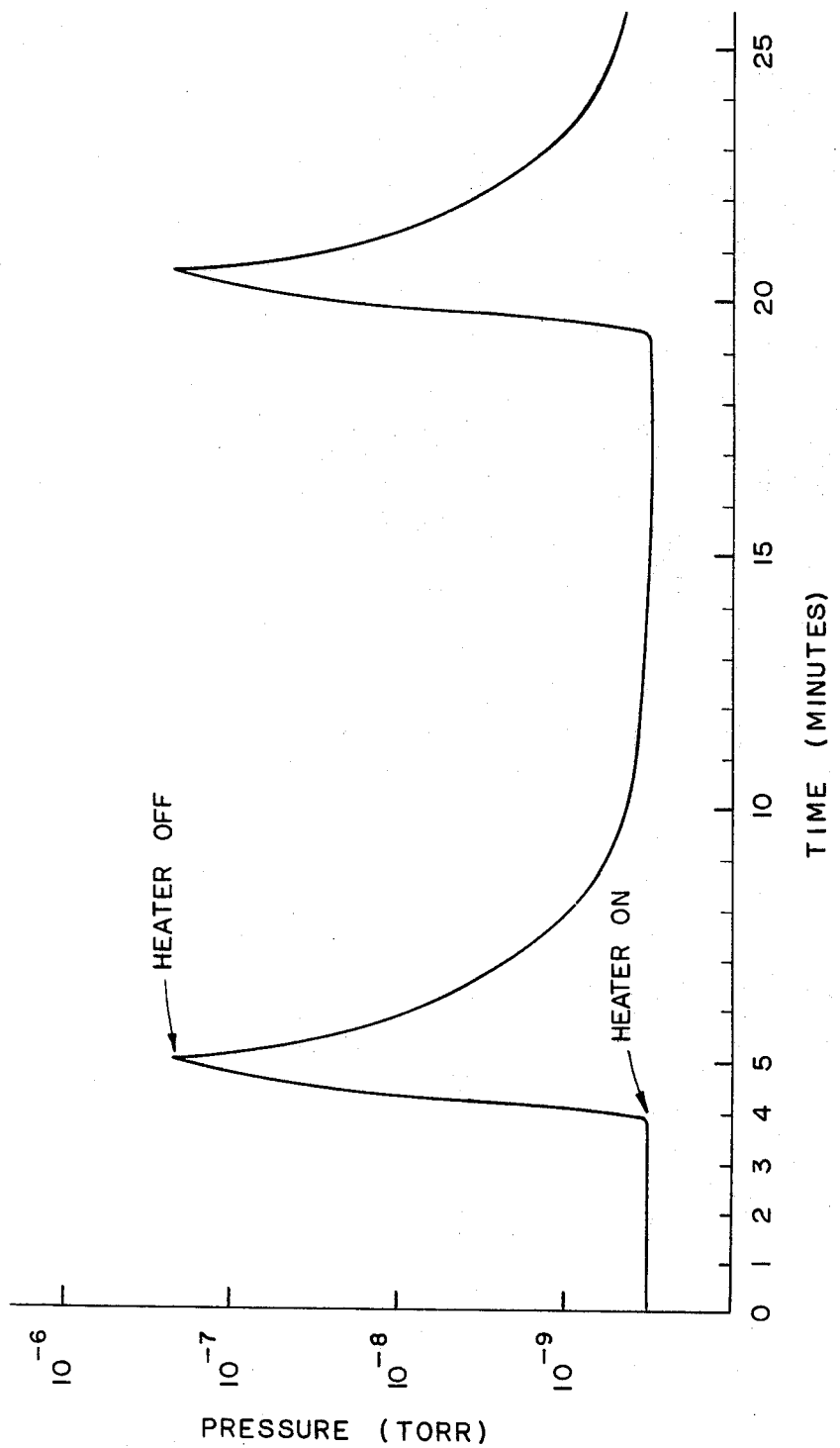

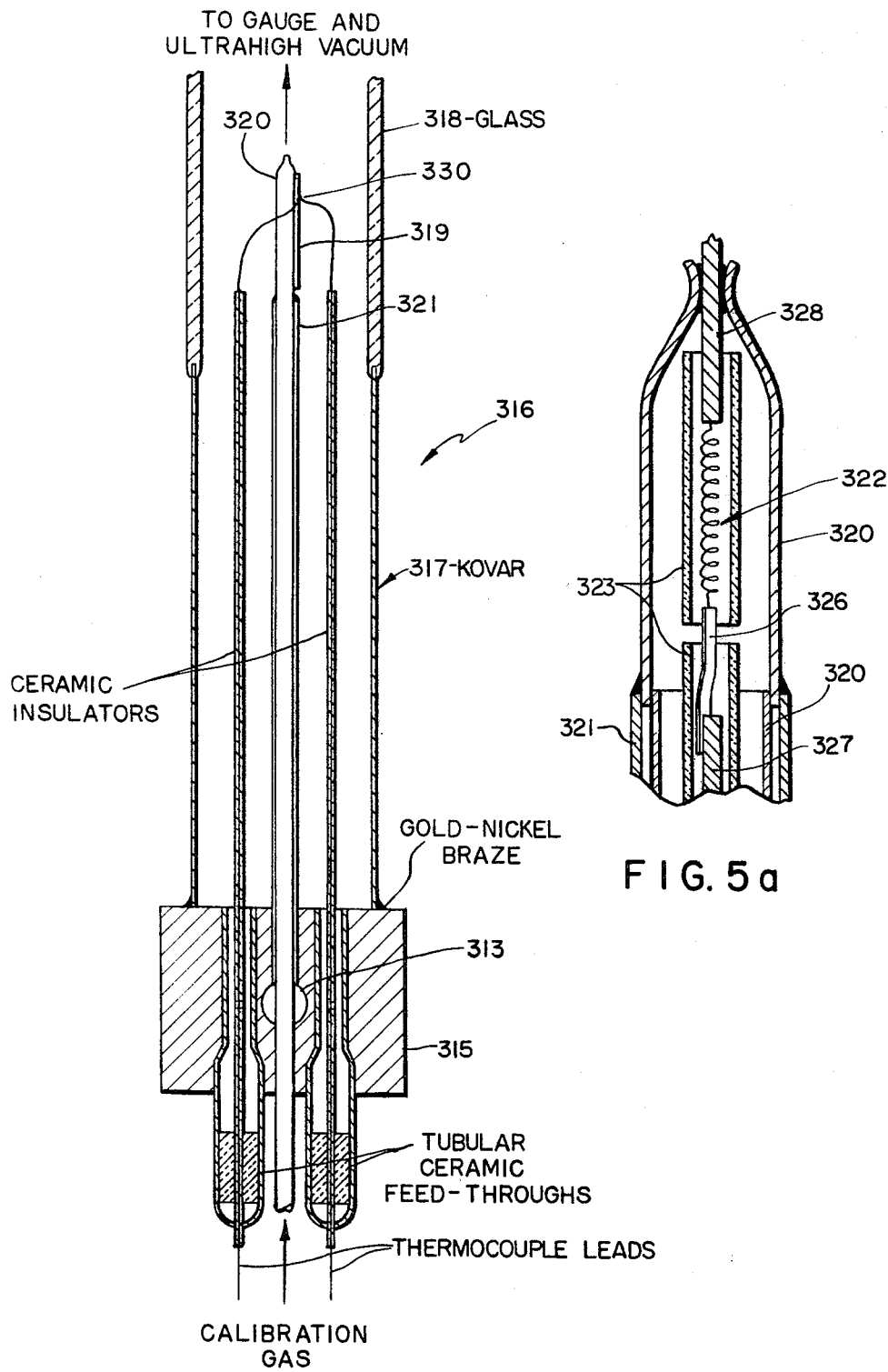

3,395,565
GAUGE CALIBRATION BY DIFFUSION
Frank J. Brock, Winchester and Frank Feakes, Lexington, Mass., assignors to National Research Corporation, Newton Highlands, Mass., a corporation of Massachusetts
Filed Mar. 11, 1966, Ser. No. 533,659
18 Claims. (Cl. 73—4)

ABSTRACT OF THE DISCLOSURE

Vacuum gauge calibration by diffusing a known quantity of gas through a heated barrier into a gauge to raise pressure in the gauge to a known level for comparison with the gauge's pressure reading.

---

The present invention relates to vacuum gauges and particularly to the measurement of ultra-high vacuum. The invention described herein was made in the performance of work under a NASA contract and is subject to the provisions of the National Aeronautics and Space Act of 1958, Public Law 85–568 (72 Stat. 426; 42 U.S.C. 2451) as amended. A license has been granted to the United States Government for practice of the invention and title to the invention and this patent have been reserved to the assignee, subject to voidability by NASA.

The present invention pertains to the calibration of vacuum devices, particularly vacuum gauges and mass spectrometers for measuring total and partial pressures in the "ultrahigh vacuum" region (defined in the American Vacuum Society standards as pressure on the order of $10^{-9}$ mm. Hg (torr), and below). The calibration of a vacuum gauge or the like may drift during operation due to malfunctioning of the gauge itself and/or malfunctioning or auxiliary equipment, such as power supplies, controls, cables, or read-out apparatus. In addition, surface effects within the gauge may cause serious departures from correct pressure sensitivity. If this calibration drift is not noticed, false pressure readings will result. For instance, in an experiment where the properties of a material under vacuum are under study, the experimenter may record certain conditions as occurring at $10^{-9}$ mm. Hg while the true pressure is much greater or much less than this figure. As another instance, a space vehicle control and mission are often dependent on a true reading of ambient gas density. A gauge which was calibrated before the launch may not have the same calibration at the time of taking these measurements.

The principle of calibration is based upon the production of a known pressure within the gauge envelope by controlling the rate of flow of a gas into and out of the gauge volume. For instance, when the gauge is being used for pressure measurement, calibration gas would not be added to the system and the system pressure will be some base pressure $P_0$. For calibration, gas is added to the gauge volume at a flow rate Q. The pressure $P_G$ established in the gauge is then related to Q by the Equation 1: $Q = C(P_G - P_0)$ where C is the conductance of the conduit which controls the rate at which the gas is removed from the gauge volume. Equation 1 may be transposed to give: $P_G = Q/C + P_0$.

Consequently, by regulating the ratio $Q/C$, the gauge pressure $P_G$ may be brought to any desired value for calibration. If required $P_G$ may be increased such that $P_0$ is negligible compared to $P_G$.

In principle the method of calibration may be used in both relative and absolute senses. An unknown gauge may be compared with a previously calibrated gauge and the above procedure used to establish the value of $Q/C$.

Alternatively, both Q and C can be measured by absolute means. For instance, C may be calculated for a known gas flowing through an orifice of known dimensions if the gas temperature is known and the free-molecule flow exists. National Bureau of Standards procedures for measuring time and volume may be used to determine Q because the volume (or mass) changes may be measured at pressures close to atmospheric where acceptable standards exist.

The success of the calibration procedure outlined above is largely dependent in the development of a method of adding small amounts of gas required for calibration. The method must be reliable, have a high degree of reproducibility and not jeopardize the pressure measurements during periods when calibration is not required.

The simplest application of the above principles is comparison of one gauge with another. This is often unsuitable particularly where the gas to be measured may cause adverse surface effects on both the "primary" and "secondary" gauges. Another common technique for calibration is of the multiple-orifice-flow type where a known flow rate is established from a region of relatively high known pressure to the ultrahigh vacuum gauge to be calibrated. However, only a single point or a limited number of calibration points can be plotted in a single run where a pre-calibrated leak is used for this purpose. A multiple orifice calibration system allows the plotting of an infinite number of calibration points, but involves a substantial weight and volume of apparatus.

It is therefore a principal object of the invention to provide a technique for calibrating vacuum gauges which is reliable and accurate.

It is a further object of the invention to reduce the size and amount of apparatus required for gauge calibration consistent with the above principal objective.

It is another object of the invention to provide for a large number of calibration cycles (as opposed to a one-shot calibration) consistent with the foregoing objects.

It is another object of the invention to provide a calibration unit in which the effects of calibration are quickly dissipated so that the gauge can resume pressure measurements quickly, consistent with the foregoing objects.

In general, these objects are met by diffusing a stored calibration gas through a permeable barrier in a "thermal valve" which is activated by heating. When inactive, the valve essentially prevents leakage of the calibration gas to the gauge. We have found that this approach results in reproducible and accurate measurements and that it is well suited to use with ultrahigh vacuum systems on the ground or in space vehicles.

The invention accordingly comprises an improved method and apparatus for calibration of ultrahigh vacuum gauges and an improved gauge with a built-in calibrator.

For a fuller understanding of the invention, reference should be had to the following detailed description of a preferred embodiment of the invention taken in conjunction with the accompanying drawings wherein:

FIG. 3 shows an operating curve for the calibration of FIG. 2;

FIG. 5 shows another embodiment of the thermal valve used in the calibrator; and FIG. 5A is a detail from FIG. 5.

The general arrangement of the gauge and calibration apparatus in the preferred embodiment is that the gauge is connected to a calibration volume either as an appendage or as a nude gauge located within the volume. The calibration volume may be a glass tube with an exit orifice, either built in as a tube constriction or inherent in the tube diameter and/or length. The function of the exit orifice is to allow a pressure rise at the gauge due to the admission of calibration gas through the thermal valve.

The design of the system is determined by the limits imposed through pumping action inherent in all ultrahigh vacuum gauges and outgassing of the gauge and calibrator. It has been shown in the art that the outgassing rate of a small glass system baked to 400° C. for 8 hours can be reduced to below $10^{-12}$ torr $1/cm.^2$ sec. The pumping speed of gauges is on the order of 0.1 to 1.0 liters per second.

Figure 1:
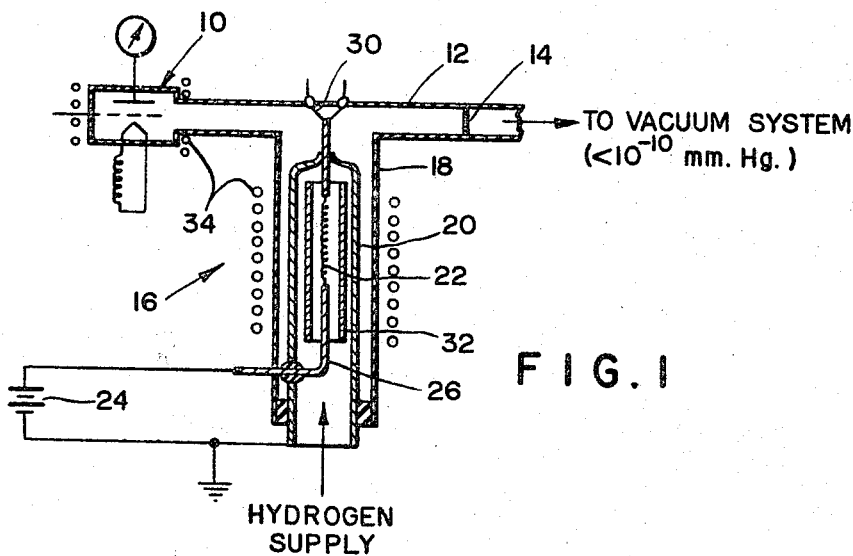
FIG. 1 is a diagrammatic view of a calibration apparatus and a gauge to be calibrated.

In FIG. 1 of the drawings, the gauge to be calibrated is shown at 10. The gauge is connected through a tube 12 to a vacuum system whose pressure is to be measured by the gauge. With the gauge properly calibrated, the pressure measured at the gauge will be directly proportional to the true pressure in the vacuum system or equal to it if gas flow rates from leaks, outgassing, gauge pumping and other extraneous sources are negligible. Within the tube is an exit orifice 14. A source 16 of calibration gas is connected to the tube to feed calibration gas to the gauge volume. The source comprises a branch tube 18 within which is disposed a permeable metal tube 20. The tube 20 is connected to a supply of calibration gas which may be as simple as a gas bottle and a valve.

The tube 20 constitutes a "thermal valve" since it only has a substantial permeability when heated. A preferred material for the thermal valve is stainless steel when hydrogen is the calibration gas. However, other materials such as nickel or palladium −25 silver alloy may be used for this purpose.

A heater 22 is provided within the thermal valve and connected to a 5 watt power supply 24. The leads of the heater are 26 and 28. A thermo-couple 30 is connected to the lead 28. The tube 20 is brazed to the lead 28 to form a vacuum tight enclosure for the calibration gas. An alumina insulator tube surrounds the heater. R.F. coils 34 are wound around the gauge and branch tube 18 for degassing heating.

Example I

A calibrator was built as described above and attached to a Nottingham gauge. The vacuum system comprised a cold trap and diffusion pump which were capable of producing pressures below $10^{-20}$ mm. Hg. The tube 20 of the thermal valve was constructed of a stainless steel tube .077 inch outer diameter and .005 inch wall thickness.

The internal diameter of the tube 12 was 1.0 in. and its length was 5 in. The exit tubulation and the orifice 14 and a conductance of 131./sec. for nitrogen at 300° K.

The gauge was pumped to an initial pressure of $4 \times 10^{-10}$ torr. Then the heater was operated at .57 watts for 60 seconds. The pressure in the gauge volume rose to $8.5 \times 10^{-10}$ torr and then recovered to the initial low pressure after termination of heating. The heating was again conducted for 60 seconds at a lower level of .96 watts and the gauge pressure reading went up to an apparent pressure of $3.5 \times 10^{-9}$ torr. The gauge recovered to the initial low pressure when heating was stopped. The above recoveries of low pressures are attainable in a few minutes after heating.

Example 2

The thermal valve of the above gauge was heated at 400° C. for 24 hours. There was no change in permeation rate. The premeation rate appears to be reproducible and a function of temperature only (for a constant hydrogen pressure in the diffuser).

Example 3

The thermal valve was heated several times to 450° C. inpulses of 3 to 5 minute periods to find if the maximum pressure in the gauge could be increased by several orders of magnitude. The pressure attained was $10^{-6}$ torr.

The choice of calibration gas and thermal barrier will depend on the calibration pressure selected and the system under investigation. Some of the feasible calibration couples are:

| Gas: | Barrier |
|---|---|
| (1) Hydrogen | Stainless steel. |
| (2) Oxygen | Silver. |
| (3) Nitrogen | Molybdeum. |
| (4) Carbon monoxide | Iron. |
| (5) Helium | Quartz or glass. |

If large throughputs are desired, suitable couples are:

| Gas: | Barrier |
|---|---|
| (6) Hydrogen | Nickel. |
| (7) Hydrogen 25% silver—75% palladium alloy. | |

In using (6) care should be observed because of the possibility of embrittlement of the nickel. Couple (7) is relatively free of this problem.

The danger of contamination can be minimized in (6) or (7), or any of the other combinations, by using a high purity calibration gas supply or by inserting a purifier upstream of the thermal valve. For instance, if the gas is hydrogen, a palladium wall is known to be a very effective purifier. If the gas is argon, it can be passed over active uranium chips upstream of the thermal valve.

In some instances, a calibration point less than an order of magnitude over the low point is satisfactory and even desirable. A typical calibration couple for this purpose would be any of (1)–(7) above or:

| Gas: | Barrier |
|---|---|
| (8) Hydrogen | Copper. |

The volume of the barrier material and selection of barrier material should not provide such a high outgassing rate as to impose significant errors on the pressure reading in either the active or inactive conditions of operation of the thermal valve. Typical dimensions are given in the above examples.

It is a common characteristic of all the suitable calibration couples that the gas moves through the thermal valve in a sub-molecular form (e.g. hydrogen ion goes through the stainless steel or copper, helium atom goes through the quartz). It is also a common characteristic of the preferred calibration couples that they have high effective activation energies. This results in a rapid rise in permeation rate with temperature. Consequently, the pressure in the calibration volume becomes a strong function of temperature. Relatively large increases in pressure may be obtained with small temperature increases and hence small power inputs. In general, a high activation energy for a couple is associated with a low diffusion coefficient. Hence, thinner walled tubing with small mass may be used to obtain the same gas throughput. The thinner walled tubing then requires less heat to raise to a required temperature. The preferred range of free energy of activation is greater than 10 kilocalories per gram-atom gas as a lower limit and about 30 kilocalories per gram-atom gas as an upper limit.

A couple of hydrogen-palladium is undesirable partly because of its high permeation rate, as indicated by a free energy of activation of 10, but mostly because of its slow temperature response and vulnerability to warping of the palladium. Couples within the above-stated range are suitable in terms of temperature response ond structural stability.

Figure 2:
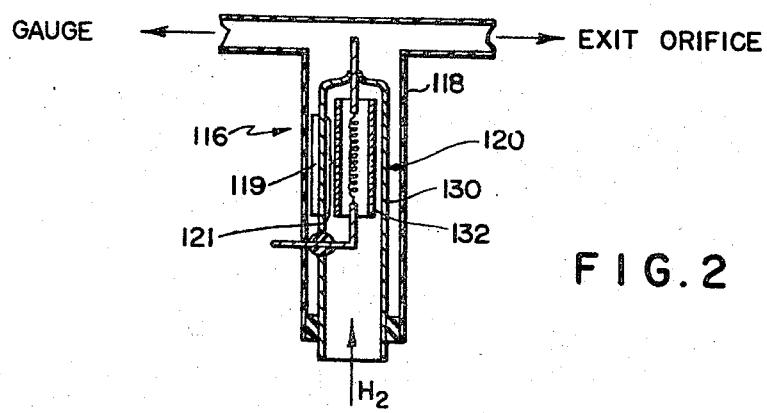
FIG. 2 shows a second embodiment of the apparatus.

A second embodiment of the invention incorporating a somewhat different thermal valve is shown in FIG. 2. The diffuser tube 120 is made of type 304 low carbon (LC) stainless steel. The low carbon steel may decrease the possibility of methane formation which may alter the reproducibility of hydrogen permeation; the permeability might vary with the amount of hydrogen passed through a high carbon stainless steel diffuser. A plate 119 is made of OFHC copper (typical dimensions ½″ x ½″ x .016″) and is brazed onto the high temperature region of the diffuser to insure that the diffuser tube portion where permeation occurs is isothermal. The exterior of the diffuser was vacuum coated with gold (thickness in excess of 1000 A.), except for the portion 121 where permeation is desired. The gold coating prevents significant permeation in other regions.

The thermal valve of the second embodiment was degassed by heating to about 650° C. by radio frequency and resistance methods.

After degassing, permeation experiments were run. A typical trace is shown in FIG. 3. As shown in the drawing, the behavior of the diffuser is repeatable from one run to the next. The diffusion rate is not altered by many runs. Pulsing from the range between $10^{-10}$ to $10^{-9}$ torr up to $1 \times 10^{-7}$ torr or $1 \times 10^{-6}$ is readily attained. The operator can control the desired final pressure to within 1% by control of diffuser heating.

Typically, pulsing to $1.00 \pm 0.1$ to $10^{-7}$ torr has been done from initial conditions of 2.2 to $10^{-10}$ torr, with the diffuser at 50° C. by running the diffuser heater at 13 volts and 0.33–0.22 amperes for 40.5 seconds, then switching a 9.35 ohm resistance into series with the heater and continuing the heating for 10 seconds. Cooling to 50° C. resulted in a pressure of $2.3 \times 10^{-10}$ torr pressure. This was accomplished in 13.75 minutes after heating was stopped.

Figure 4:
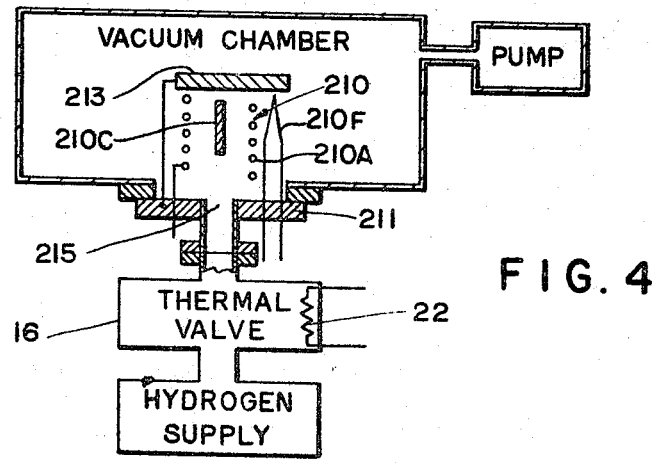
FIG. 4 shows a modified calibrator-gauge arrangement.

A third embodiment is shown in FIG. 4. This shows the calibration technique of the invention adapted for use with a nude gauge. A nude gauge indicated at 210 and comprises the usual electrodes (e.g., cathode 210F, anode 210A and collector 210C) mounted from a flange 211. Also mounted from the flange is a baffle plate 213. Passing through the flange is a tubular passage 215. The hydrogen supply and thermal valve are connected to the passage 215 so that it serves as a tubular outlet for the calibration gas. The baffle 213 is arranged in line of sight relation to the outlet 215 and normal to the path provided by the tubular passage 215 to reflect gasses back with a specific distribution, preferably a cosine distribution, aimed primarily at the gauge 210. With this geometry, calibration gas introduced via valve 16 and outlet 215 can be accurately measured by the gauge 210. This arrangement does away with the need for an exit restriction as in the embodiments of FIGS. 1 and 2.

The baffle 213 should be adjacent the gauge 210 and it is preferably flat, but curved shapes may be employed.

Another embodiment of the thermal valve is shown in FIGS. 5 and 5A. As in the previous embodiments, the heart of the valve is a permeation tube 320 which receives calibration gas in its interior and is heated to provide permeation of the gas through the tube to its exterior. A copper fin (319) maintains isothermal conditions along the desired region of permeation. A tungsten filament heater 322 is located within the tube at the desired region of permeation. The heater has leads 326 and 328 which consist of nickel ribbons. Lead 328 is brazed to the tube 320 and lead 326 is brazed to a tungsten rod 327 which runs the length of the tube to a feedthrough (not shown). A thermocouple junction 330 is located on the fin 319. Insulated thermocouple leads run the length of the valve. Ceramic insulator sleeves 323 surround the heater and tungsten rod.

The unique feature of this embodiment is a metal skirt 321 which forms a vacuum jacket surrounding the tube 320 where permeation is not desired. The skirt is brazed to the tube at the end of the skirt near the heater and open at the far end to provide a gas passage leading away from the heater. The skirt also reduces thermal isolation of the diffuser; this speeds up the rate of recovery after a calibration pulse. A port 313 leading to a vacuum pump (e.g., a mechanical pump,) is provided at the far end of the metal skirt in a block 315.

A Kovar tube 317 surrounds the leads and tube and may be mated to a branch tube 318 of an ultra-high vacuum gauge by a conventional glass-Kovar seal.

The manifold 315 is isolated from the ultra-high vacuum conditions prevailing within the assembled tube 317/318. The elongated annular passage between tube 320 and skirt 321 provides an effective way of removing those gasses which do permeate through the lower portion of tube 320. The net result is a high sensitivity thermal valve.

It will be apparent that other embodiments can be made within the scope of our invention. It is therefore intended that the above description and accompanying drawing shall be read as illustrative and not in a limiting sense.

What is claimed is:

1. An improved method of calibrating a vacuum gauge, or the like, which is connected to a vacuum pumping means, the method comprising the steps of storing a calibration gas upstream of a diffusion barrier at a pressure above the vacuum region, placing the downstream side of the barrier in communication with the gauge to be calibrated, the calibration gas and barrier material being selected from couples having an effective free energy of activation greater than 10 kilocalories per gram per atom and less than about 30 kilocalories per gram per atom, and intermittently heating the barrier to a known temperature to increase the rate of permeation to raise the pressure in the gauge by a known amount for brief calibration periods for comparison with the gauge's pressure reading.

2. The method of claim 1 wherein the gas is hydrogen and the barrier is stainless steel.

3. The method of claim 1 wherein the gas is helium and the barrier is selected from the group consisting of quartz, silica and glass.

4. The method of claim 1 wherein the gas is nitrogen and the barrier is molybdenum.

5. The method of claim 1 wherein the gas is oxygen and the barrier is silver.

6. The method of claim 1 wherein the gas is carbon monoxide and the barrier is iron.

7. The method of claim 1 wherein the gas is hydrogen and the barrier is copper.

8. The method of claim 1 wherein the calibration gas is selected to diffuse through the gas in sub-molecular form and wherein the barrier is selected to sufficiently block flow of gas molecules when cool to provide a permeation rate Q in torr liters per second, which is less than the product PC where P is said lower limit of the gauge and wherein C is the conductance from the gauge to the said pumping means.

9. A predictable gas source apparatus for use in vacuum gauge calibration and the like comprising in combination: means defining a closed volume; means for connecting a device such as a gauge or the like which is to utilize a supply gas admitted to the closed volume at a known pressure to said closed volume; means defining an exit orifice from said closed volume; means defining a thermal valve connected to said closed volume; means for storing a gas supply on the side of said valve away from the closed volume and means for heating the thermal valve to a known temperature to provide a predetermined flow rate of said gas into the volume with said flow rate and known flow and pressure characteristics of said volume and exit means providing said predetermined pressure in the volume.

10. The apparatus of claim 9 further comprising a vacuum pump wherein the exit orifice means places the apparatus in communication with said vacuum pump.

11. The apparatus of claim 9 wherein the thermal valve comprises a stainless steel tube.

12. The apparatus of claim 9 in an improved ultra-high vacuum enclosed gauge-gauge calibrator combination wherein the said device comprises an enclosed gauge;

the gauge being connected to said volume through a passage which bypasses said closed volume exit; the said thermal valve means being in said passage.

13. The apparatus of claim 12 wherein the thermal valve is a metal tube with an internal electric heater, the tube forming a portion of one of the leads for the electric heater.

14. The apparatus of claim 12 wherein a portion of the thermal valve structure is coated with a material having a lower constant of diffusion than the barrier material.

15. The improved ultra-high vacuum gauge-gauge calibrator combination of claim 14 wherein the gauge comprises a nude gauge mounted on a flange.

16. The apparatus of claim 15 wherein the said passage means comprises a tubular outlet into the gauge region, the apparatus further comprising a baffle mounted adjacent the gauge, the baffle being constructed and arranged as a line of sight target with respect to said tubular outlet and the baffle also being constructed and arranged to reflect incident molecules with a specific distribution aimed at the gauge.

17. The apparatus of claim 16 wherein the specific distribution is a cosine distribution.

18. A thermal valve assembly for ultra-high vacuum gauge calibration apparatus and the like comprising a source of gas, a closed permeation tube leading from said gas source into an ultra-high vacuum region, a heater located within said tube at the end of the tube away from the gas source to define a thermal valve element at said end, passage forming means surrounding the tube between the heater and gas source, the passage forming means having an exit at a point thereof remote from the heater, a vacuum pump connected to said exit, means on said tube in proximity to the heater for maintaining constant temperature along the region of the tube surrounding the heater, a thermocouple junction for measuring the temperature of the tube in proximity to the heater and thermocouple leads leading from said junction to feedthroughs in the thermal valve assembly, and means for removing gas from all exterior portions of the thermal valve assembly remote from the desired diffusion area near the heater.

References Cited

UNITED STATES PATENTS 3,224,248  12/1965  Santeler _____ 73—4

OTHER REFERENCES

Flanick and Ainsworth, Vacuum Gauge Calibration System, The Review of Scientific Instruments, vol. 32, pp. 408–410 (1961).

Hoffman, Vacuum Gauge Calibration to $5 \times 10^{-7}$ torr, Research/Development, pp. 62–65, April 1963.

Roehrig and Simons, Jr., Accurate Calibration of Vacuum Gauges to $10^{-9}$ torr, Transactions of the 8th National Vacuum Symposium, pp. 511–518 (1961).

DAVID SCHOENBERG, *Primary Examiner.*

N. B. SIEGEL, *Assitsant Examiner.*